United States Patent
Alshakhs et al.

(10) Patent No.: US 10,711,582 B2
(45) Date of Patent: Jul. 14, 2020

(54) SALINATED WASTEWATER FOR ENHANCING HYDROCARBON RECOVERY

(71) Applicants: Saudi Arabian Oil Company, Dhahran (SA); The Board of Trustees of the Leland Stanford Junior University, Stanford, CA (US)

(72) Inventors: Mohammed J. Alshakhs, Al Ahsa (SA); Anthony R. Kovscek, Stanford, CA (US)

(73) Assignees: Saudi Arabian Oil Company, Dhahran (SA); The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 15/958,300

(22) Filed: Apr. 20, 2018

(65) Prior Publication Data

US 2019/0323327 A1 Oct. 24, 2019

(51) Int. Cl.
*E21B 43/20* (2006.01)
*G01N 13/02* (2006.01)
*C09K 8/584* (2006.01)

(52) U.S. Cl.
CPC .............. *E21B 43/20* (2013.01); *C09K 8/584* (2013.01); *G01N 13/02* (2013.01); *G01N 2013/0208* (2013.01)

(58) Field of Classification Search
CPC ........ E21B 43/20; C09K 8/584; G01N 13/02; G01N 2013/0208
USPC ...................................................... 166/270.1
See application file for complete search history.

(56) References Cited

U.S. PATENT DOCUMENTS

| 7,726,398 B2 * | 6/2010 | Collins .................... E21B 43/20 166/266 |
| 7,987,907 B2 | 8/2011 | Collins et al. |
| 8,101,556 B2 * | 1/2012 | Norman .................... C09K 8/52 166/268 |
| 8,789,594 B2 | 7/2014 | Curole et al. |

(Continued)

FOREIGN PATENT DOCUMENTS

| WO | 2007138327 | 12/2007 |
| WO | 2010092095 | 8/2010 |

(Continued)

OTHER PUBLICATIONS

Alshakhs and Kovscek, "An Experimental Study of the Impact of Injection Water Composition on Oil Recovery from Carbonate Rocks," SPE-175147-MS, presented at SPE Annual Technical Conference and Exhibition, Sep. 28-30, 2015, 21 pages.

(Continued)

*Primary Examiner* — Silvana C Runyan
(74) *Attorney, Agent, or Firm* — Fish & Richardson P.C.

(57) ABSTRACT

Methods of preparing an injection fluid for enhancing hydrocarbon recovery from a formation are described. A divalent salt is added to wastewater to form salinated wastewater. The salinated wastewater is tested for a shift in wettability. The salinated wastewater is tested for a change in oil recovery. The salinated wastewater is applied as an injection fluid. The shift in wettability is equal to or greater than a predetermined wettability differential value, and the change in oil recovery of the salinated wastewater is equal to or greater than a predetermined oil recovery differential value.

16 Claims, 5 Drawing Sheets

(56) References Cited

U.S. PATENT DOCUMENTS

| | | | |
|---|---|---|---|
| 8,869,892 | B2 | 10/2014 | Pone |
| 9,085,971 | B2 | 7/2015 | Janssen et al. |
| 2010/0006283 | A1* | 1/2010 | Collins .................. C09K 8/58 166/261 |
| 2011/0306525 | A1 | 12/2011 | Lighthelm |
| 2016/0024372 | A1 | 1/2016 | Fathi |
| 2016/0356126 | A1 | 12/2016 | Abdallah et al. |
| 2017/0204323 | A1* | 7/2017 | Ayirala .................. C09K 8/588 |

FOREIGN PATENT DOCUMENTS

| | | |
|---|---|---|
| WO | 2012012235 | 1/2012 |
| WO | 2012125539 | 9/2012 |
| WO | 2013098193 | 7/2013 |
| WO | 2013117741 | 8/2013 |

OTHER PUBLICATIONS

Alshakhs and Kovscek, "Modeling the Role of Wettability Alteration with Brine Composition and Increased Oil Recovery from Carbonate Cores. An Experimental Study of the Impact of Injection Water Composition on Oil Recovery from Carbonate Rocks," SPE-182789-MS, presented at SPE Kindom of Saudi Arabia Annual Technical Symposium and Exhibition, Apr. 25-28, 2016, 9 pages.

Alshakhs and Kovscek, "Understanding the role of brine ionic composition on oil recovery by assessment of wettability from double layer forces," Advances in Colloid and Interface Science, vol. 233, Jul. 2016, 13 pages.

Alshakhs, "An Experimental Study of the Impact of Injection Water Composition on Oil Recovery from Carbonate Rocks," a dissertation submitted to the department of energy resources engineering and the committee on graduate studies of Stanford University in partial fulfillment of the requirements for the degree of Doctor of Philosophy, Jun. 2015, 171 pages.

Austad et al., "Seawater in Chalk: An EOR and compaction Fluid," SPE Reservoir Evaluation and Engineering, vol. 11, Aug. 2008, 7 pages.

Kajenthira et al., "The case for cross-Sectoral Water Reuse in Saudi Arabia: Bringing Energy into the Water Equation," Technical Report, Belfer Center for Science and International Affairs, Jun. 2011, 16 pages.

Lager et al., "Impact of Brine Chemistry on Oil Recovery Experiments," EAGE—14th European Symposium on Improved Oil Recovery, Apr. 22-24, 2007, 9 pages.

Ouda, "Review of Saudi Arabia Municipal Water Tariff," World Environment vol. 3, No. 2, Jan. 2013, 5 pages.

Seccombe et al., "Demonstration of Low-Salinity EOR at Interwell Scale, Endicott Field, Alaska," in SPE-129692, presented at the 2010 SPE Improved Oil Recovery Symposium, Apr. 24-28, 2010, 12 pages.

WaterReuse Association Desalination Committee, "Seawater Desalination Costs," Technical Report, American Membrane Technology Association, Sep. 2011, revised Jan. 2012, 20 pages.

Lake, "Enhanced oil recovery," Old Tappan NJ; Prentice Hall Inc., a division of Simon and Schuster, 1989, 550 pages.

International Search Report and Written Opinion issued in International Application No. PCT/US2019/027595 dated Jun. 13, 2019, 17 pages.

Zhang et al., "Wettability alteration and improved oil recovery by spontaneous imbibition of seawater in chalk: Impact of the potential determining ions $CA^{2+}$, $Mg^{2+}$, and $SO4^{2-}$," Colloids and Surfaces A: Physiochemical and Engineering Aspects, Elsevier, Amsterdam, NL, vol. 301, No. 1-3, Apr. 26, 2007, 10 pages.

* cited by examiner

SALINATED WASTEWATER FOR ENHANCING HYDROCARBON RECOVERY

TECHNICAL FIELD

This specification relates to fluid injection for enhanced hydrocarbon recovery.

BACKGROUND

Hydrocarbon production from rock formations can include multiple stages of oil recovery. The first stage of hydrocarbon production, also referred to as primary recovery, involves utilizing natural reservoir energy to drive hydrocarbons from the reservoir, into the wellbore, and up to the surface. The primary recovery stage can reach its end when the available energy in the reservoir is depleted. During primary recovery, typically only around 10% of the initial hydrocarbons in the reservoir is recovered. The second stage of hydrocarbon production, also referred to as secondary recovery, involves injecting an external fluid such as water or gas into the reservoir through injection wells in order to maintain reservoir pressure and displace hydrocarbons toward the wellbore. Common secondary recovery methods include gas injection and waterflooding. The secondary recovery stage can reach its end when the injected fluid is produced in considerable amounts from the production wells. During secondary recovery, additional hydrocarbons can be recovered from the reservoir. The third stage of hydrocarbon production, also referred to as tertiary recovery or enhanced oil recovery, involves any recovery method that follows secondary recovery, such as waterflooding or pressure maintenance. During tertiary recovery, additional hydrocarbons can be recovered from the reservoir.

SUMMARY

The present disclosure describes technologies relating to fluid injection for enhancing hydrocarbon recovery.

Certain aspects of the subject matter described here can be implemented as a method of preparing an injection fluid for enhancing hydrocarbon recovery from a formation. A divalent salt is added to wastewater to form salinated wastewater. The salinated wastewater is tested for a shift in wettability. The salinated wastewater is tested for a change in oil recovery. The salinated wastewater is applied as an injection fluid. The shift in wettability is equal to or greater than a predetermined wettability differential value, and the change in oil recovery of the salinated wastewater is equal to or greater than a predetermined oil recovery differential value.

This, and other aspects, can include one or more of the following features. The wastewater can be treated wastewater, which can include a total dissolved solids (TDS) level that is less than 15,000 parts per million (ppm). The salinated wastewater can be a salinated treated wastewater.

The predetermined wettability differential value can be a difference in the shift in wettability of a first rock sample tested with the wastewater prior to salination and following salination.

The predetermined oil recovery differential value can be a difference in an amount of oil recovered from a second rock sample with the wastewater prior to salination and following salination.

Testing the salinated wastewater for a change in oil recovery can include performing a core flooding experiment.

The first rock sample can include a representative sample of the formation, and the second rock sample can include a representative sample of the formation.

Testing the salinated wastewater for a shift in wettability can include measuring a contact angle between an oil droplet and the first rock sample submerged in the salinated wastewater, in which a decrease in the contact angle can signify a shift toward water-wetness and an increase in the contact angle can signify a shift toward oil-wetness.

Testing the salinated wastewater for a shift in wettability can include performing a displacement method to determine an Amott index, an Amott-Harvey index, United States Bureau of Mines (USBM) index, or a combination of these.

The divalent salt can include a magnesium salt, a calcium salt, a sulfate, or a combination of these.

The salinated wastewater can have a magnesium salt concentration within a range of 5,000 ppm to 25,000 ppm.

The salinated wastewater can have a sulfate salt concentration within a range of 1,000 ppm to 20,000 ppm.

The salinated wastewater can include a sulfate salt, and the salinated wastewater can have a sulfate salt concentration that is lower than the magnesium salt concentration.

The sulfate salt can be added after the magnesium salt.

Certain aspects of the subject matter described here can be implemented as a method of preparing an injection fluid for enhancing hydrocarbon recovery from a formation. A divalent salt is added to wastewater to form salinated wastewater. The salinated wastewater is tested for a shift in wettability. The salinated wastewater is tested for a change in oil recovery. The salinated wastewater is applied as an injection fluid. The shift in wettability is equal to or greater than a predetermined wettability differential value, and the change in oil recovery of the salinated wastewater is equal to or greater than a predetermined oil recovery differential value. The predetermined wettability differential value is a difference in the shift in wettability of a first rock sample tested with the wastewater prior to salination and following salination. The predetermined oil recovery differential value is a difference in an amount of oil recovered from a second rock sample with the wastewater prior to salination and following salination.

This, and certain aspects, can include one or more of the following features. The predetermined oil recovery differential value can be at least 3%.

The predetermined oil recovery differential value can be at least 5%.

The predetermined wettability differential value can be at least a change of 5 degrees in contact angle.

The predetermined oil recovery differential value can range between 3% and 10%.

The predetermined oil recovery differential value can range between 3% and 5%.

The first and second rock samples can include representative samples of a formation in which enhancing hydrocarbon recovery is desired.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

A common practice in the oil and gas industry is to inject water into a hydrocarbon reservoir to maintain its pressure and displace hydrocarbons to production wells. This injection of water is commonly referred to as secondary stage injection or secondary recovery. Seawater and aquifer water are some of the more widely used resources for injection. Injection of a second fluid in order to displace additional hydrocarbons after no more hydrocarbons are being extracted using the first fluid is referred to as tertiary stage injection or tertiary recovery. A remaining portion of the initial hydrocarbons in the reservoir can be extracted utilizing expensive enhanced recovery techniques, such as carbon dioxide ($CO_2$) injection or chemical flooding. A relatively more recent technique involves injection of aqueous solutions with modified ionic compositions.

Regarding hydrocarbon production, the wettability of a reservoir can affect the hydrocarbon extraction process. Wettability is the tendency of a fluid to spread across or adhere to a solid surface in the presence of other immiscible fluids. In relation to the oil and gas industry, wettability can refer to the interaction between fluids such as hydrocarbons or water and a reservoir rock. A possible measure of wettability of a solid surface is defined by a contact angle of a fluid (such as a hydrocarbon droplet) with the surface (such as a rock formation) in the presence of another immiscible fluid (such as water or brine). A rock surface can be described as being water-wet, intermediate-wet, or oil-wet, which translate to contact angle ranges of approximately 0° to 75°, 75° to 105°, and 105° to 180°, respectively. In this disclosure, "approximately" means a deviation or allowance of up to 10%, and any variation from a mentioned value is within the tolerance limits of any machinery used to manufacture the part. Porous media, such as carbonate rock, can be complex and can have several configurations in different areas of the same formation due to the varied geometry and mineralogy of pore space. The wettability of such rock formation can therefore be heterogeneous, and heterogeneous wettability can further affect hydrocarbon recovery from rock formations in which hydrocarbons are trapped.

A shift in wettability of a formation, such as carbonate rock, toward water-wetness can allow the extraction of additional hydrocarbons from the formation. Water flooding methods, can be considered to be a physical displacement method. The ionic composition of an aqueous brine solution, however, can trigger chemical interactions between a rock surface of a reservoir, oil, and the brine solution at a pore-scale level and can thereby alter wettability of the rock surface. Such brine solutions can be prepared by modifying the properties of treated wastewater. The salinity (that is, ionic composition) of treated wastewater can be altered by increasing the concentration of divalent ions such as magnesium or sulfate ions, through addition of their respective salts. The concentration of salts to be added to the treated wastewater can be determined based on a targeted shift in wettability.

The subject matter described in this specification can be implemented in particular implementations, so as to realize one or more of the following advantages. The cost of modifying the ionic composition of treated wastewater by the addition of salts can be relatively cheaper than modification with chemicals for preparing an enhanced recovery injection fluid. The cost of modifying the ionic composition of treated wastewater by the addition of salts can be relatively cheaper than diluting a source of saltwater with distilled water or adding salt to distilled water. The methods described in this specification can take advantage of the presence of rock components (such as salts, minerals, or anhydrites) in a rock formation. When the treated wastewater is introduced to a formation, the interaction of the treated wastewater with the components in the rock formation can cause dissolution of such components, which can provide additional divalent ions. Significant amounts of treated wastewater are disposed across the world instead of being recycled and utilized due to economical or logistical reasons. Implementation of the subject matter can increase the utilization of treated wastewater in an economical way. Other advantages will be apparent to those of ordinary skill in the art.

Figure 1:
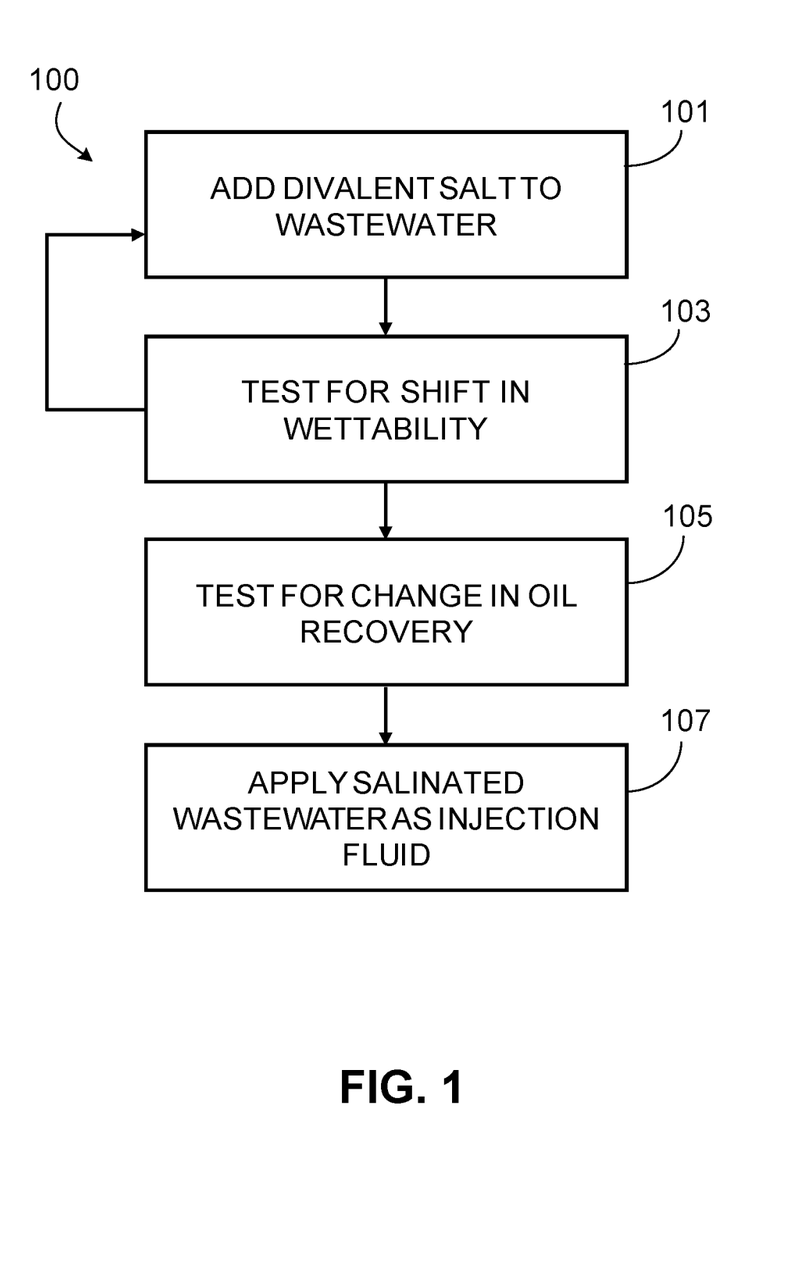
FIG. 1 is a flow chart of an example of a method for preparing an injection fluid from treated wastewater.

FIG. 1 is a flow chart illustrating a method 100 for preparing an injection fluid for enhancing hydrocarbon recovery from a formation. At 101, a divalent salt can be added to wastewater to form salinated wastewater. The wastewater can be a treated wastewater. The treated wastewater can be any wastewater that has been treated to comply with government and engineering guidelines and standards, regarding characteristics such as environmental friendliness, suspension fluid concentration, total dissolved solids (TDS) level, pH, and hydrogen sulfide concentration. It is desirable to utilize treated wastewater that is compatible with the formation from which hydrocarbon is being extracted. As an example, the treated wastewater can have TDS levels that are less than 15,000 parts per million (ppm). The following description describes the preparation of an injection fluid from a treated wastewater. If a wastewater that has not been treated (that is, an untreated wastewater) already has the characteristics of a treated wastewater and is compatible with the formation from which hydrocarbon is being extracted, then that untreated wastewater can be used. In such cases, "salinated treated wastewater" in the following description can be understood to be replaced by "salinated wastewater". The divalent salt can be any salt that dissociates into at least a cation with a +2 charge. For example, the divalent salt can be a magnesium (Mg) salt, which dissociates to produce magnesium ions ($Mg^{2+}$) and accompanying anions with a −2 charge. As another example, the divalent salt can be a sulfate salt, which dissociates to produce sulfate ions ($SO_4^{2-}$) and accompanying cations with a +2 charge. Another example of a divalent salt that can be utilized is a calcium salt. In certain implementations, a magnesium salt can be added first to form salinated treated wastewater that has a magnesium salt concentration that is within a range of 5,000 ppm to 20,000 ppm.

At 103, the salinated treated wastewater can be tested for a shift in wettability. The testing for the shift in wettability can include testing a first rock sample with the salinated treated wastewater to determine a shift in wettability of the first rock sample. The first rock sample can be a representative sample of the formation from which hydrocarbon extraction is desired. The testing of the first rock sample can include a measurement of a contact angle between an oil droplet and a surface of the first rock sample, submerged in the salinated treated wastewater. An example of a contact angle measurement apparatus 200 is described later and shown in FIG. 2. A decrease in contact angle between an oil droplet and the surface of the first rock sample can signify a shift in wettability of the first rock sample toward water-wetness. An increase in contact angle between an oil droplet and the surface of the first rock sample can signify a shift in wettability of the first rock sample toward oil-wetness. If a shift in wettability of the first rock sample toward water-wetness is not achieved, the method 100 can cycle back to 101 to add more salt—the same salt or a different salt from the salt added previously—to the salinated treated wastewater. For example, a sulfate salt can be added to the salinated treated wastewater. The sulfate salt can optionally be added after the addition of a magnesium salt. The sulfate salt concentration can be lower than the magnesium salt concentration in the resulting salinated treated wastewater. In certain implementations, the salinated treated wastewater has a sulfate salt concentration within a range of 1,000 ppm to 20,000 ppm.

In certain implementations, the testing of the first rock sample can include a displacement method to determine an Amott index, an Amott-Harvey index, United States Bureau of Mines (USBM) index, or any combination of these indices. The determination of such indices can involve core flooding experiments. The core flooding experiment can involve fluid injection or centrifuge methods to flood the rock sample. An example of a core flooding apparatus 400 is described later and shown in FIG. 4. The Amott index can be an Amott water index ($I_w$) or an Amott oil index ($I_o$), both of which can be a value in a range of 0 to 1. A water-wet rock sample can have a value close or equal to 1 for $I_w$ and a value close or equal to 0 for $I_o$. An oil-wet rock sample can have a value close or equal to 0 for $I_w$ and a value close or equal to 1 for $I_o$. Therefore, either an increase in the Amott water index ($I_w$) or a decrease in the Amott oil index ($I_o$) of a rock sample can signify a shift in wettability towards water-wetness. The Amott-Harvey index is a variation of the Amott index and is equal to the difference between the Amott water index and the Amott oil index ($I_w$–$I_o$) and can have a value in a range of −1 to 1. An Amott-Harvey index value close to or equal to 1 can describe a water-wet rock sample, while an Amott-Harvey index value close to or equal to −1 can describe an oil-wet rock sample. Therefore, an increase in the Amott-Harvey index of a rock sample can signify a shift in wettability towards water-wetness. Similar to the Amott-Harvey index, the USBM index can have a value in a range of −1 to 1. A USBM index value close to or equal to 1 can describe a water-wet rock sample, while a USBM index value close to or equal to −1 can describe an oil-wet rock sample. Therefore, an increase in the USBM index of a rock sample can signify a shift in wettability towards water-wetness.

Once a shift in wettability of the first rock sample toward water-wetness is obtained, the salinated treated wastewater can be tested for oil recovery at 105. The shift in wettability can be a comparison between the salinated treated wastewater and any injection fluid that was utilized previously. For example, the shift in wettability can be a comparison between the current salinated treated wastewater and a previous salinated treated wastewater. As another example, the shift in wettability can be a comparison between the salinated treated wastewater and a connate water of the formation. The testing for oil recovery can include testing a second rock sample with the salinated treated wastewater in a core flooding experiment to determine a change in oil recovery. The second rock sample can be a representative sample of the formation from which hydrocarbon extraction is desired, like the first rock sample.

The suitability of the salinated treated wastewater as injection fluid is determined based on the change in oil recovery from the second rock sample. Similar to 105, the change in oil recovery can be determined by core flooding experiments utilizing the salinated treated wastewater. The change in oil recovery can include a comparison between the salinated treated wastewater and any injection fluid that was utilized previously. For example, the change in oil recovery can be a comparison between the current salinated treated wastewater and a previous salinated treated wastewater. As another example, the change in oil recovery can be a comparison between the salinated treated wastewater and a connate water of the formation. If the change in oil recovery from the second rock sample with the salinated treated wastewater is positive, that is, oil recovery is increased, then the salinated treated wastewater is suitable as an injection fluid for the rock formation. If there is little to no change in oil recovery from the second rock sample with the salinated treated wastewater (for example, less than 3% increase in oil recovery), then the salinated treated wastewater may be deemed unsuitable as an injection fluid for the rock formation in terms of economic viability.

At 107, the salinated treated wastewater is applied as injection fluid to enhance hydrocarbon recovery from the rock formation. The suitability of the salinated treated wastewater can be determined by the differential value (that is, additional amount) of oil recovery using the salinated treated wastewater. If the differential value of oil recovery using the salinated treated wastewater is larger than a predetermined oil recovery differential value, the salinated treated wastewater can be determined to be suitable for enhancing hydrocarbon recovery from the formation. For example, an additional amount of oil extracted from the second rock sample of at least 3% of an initial amount of oil present in the second rock sample can signify that the tested salinated treated wastewater is suitable as the injection fluid for the rock formation. As one example, if a rock sample initially contained 20 milliliters (mL) of oil, and the use of salinated treated wastewater with a magnesium salt concentration of 8,000 ppm as a secondary or tertiary injection enabled an additional 1 mL of oil to be extracted from the rock sample, that salinated treated wastewater can be determined to be a suitable injection fluid for the rock formation.

Figure 2:
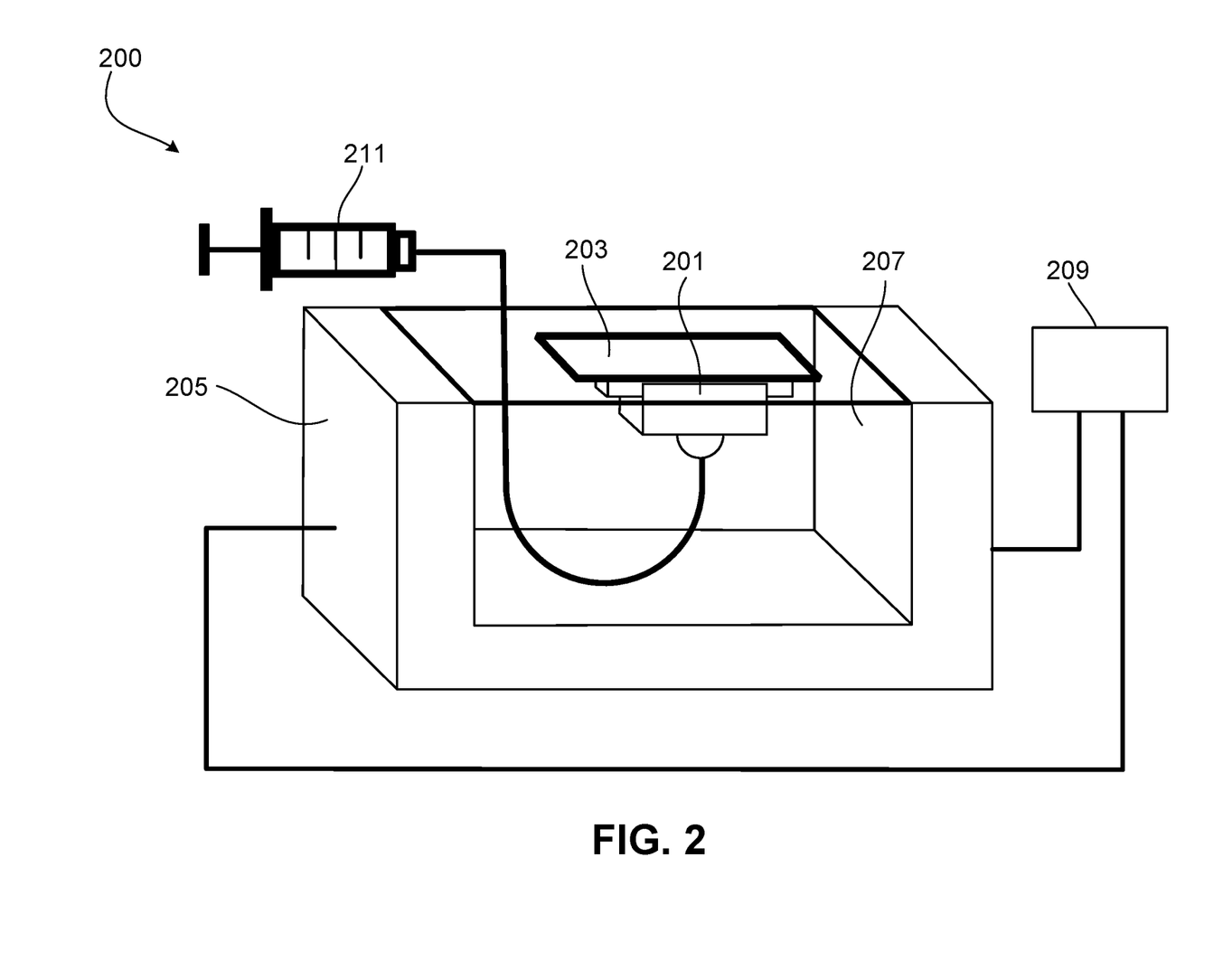
FIG. 2 is a diagram of an example of a contact angle measurement apparatus.

FIG. 2 illustrates an example of a contact angle measurement apparatus 200. The contact angle measurement apparatus 200 can include a housing 205, a chip holder 203, a syringe 211, and a heating circuit 209. The housing 205 can hold a volume of testing fluid 207, such as salinated treated wastewater developed from method 100. The housing 205 can be connected to the heating circuit 209, and the heating circuit 209 can circulate a heating fluid to maintain the operating temperature of the testing fluid 207. The temperature of the testing fluid 207 can mimic subsurface conditions. For example, the heating circuit 209 can circulate hot water to maintain the salinated treated wastewater at a temperature within a range of approximately 90 degrees Celsius (° C.) to 180° C. (194 degrees Fahrenheit (° F.) to 356° F.). A rock sample 201 can be secured in the chip holder 203, and the chip holder 203 can hold the rock sample 201 submerged in the testing fluid 207. For example, the chip holder 203 can hold a smooth calcite crystal or a rock sample of the formation from which hydrocarbon extraction is desired. The syringe 211 can hold a volume of oil (for example, hydrocarbon oil from a rock formation), and the syringe 211 can be used to deposit an oil droplet onto the rock sample 201 from below. The rock sample 201 can have a smooth, flat surface on which an oil drop can be deposited.

Imaging equipment, such as a camera controlled by a computer and a light source directed at the rock sample 201

(these components are not shown in FIG. 2), can be used to obtain image data of an oil droplet on the rock sample 201 submerged in the testing fluid 207. A contact angle between the oil droplet and the rock sample 201 can be determined from the obtained image data, and the wettability of the rock sample 201 can be defined by the measured contact angle. In relation to method 100, the contact angle measurement apparatus 200 can be utilized to test salinated treated wastewater to determine a shift in wettability of a rock sample 201 at step 103. A decrease in contact angle between the oil droplet and the rock sample 201 can signify a shift in wettability of the rock sample toward water-wetness.

Figure 3:
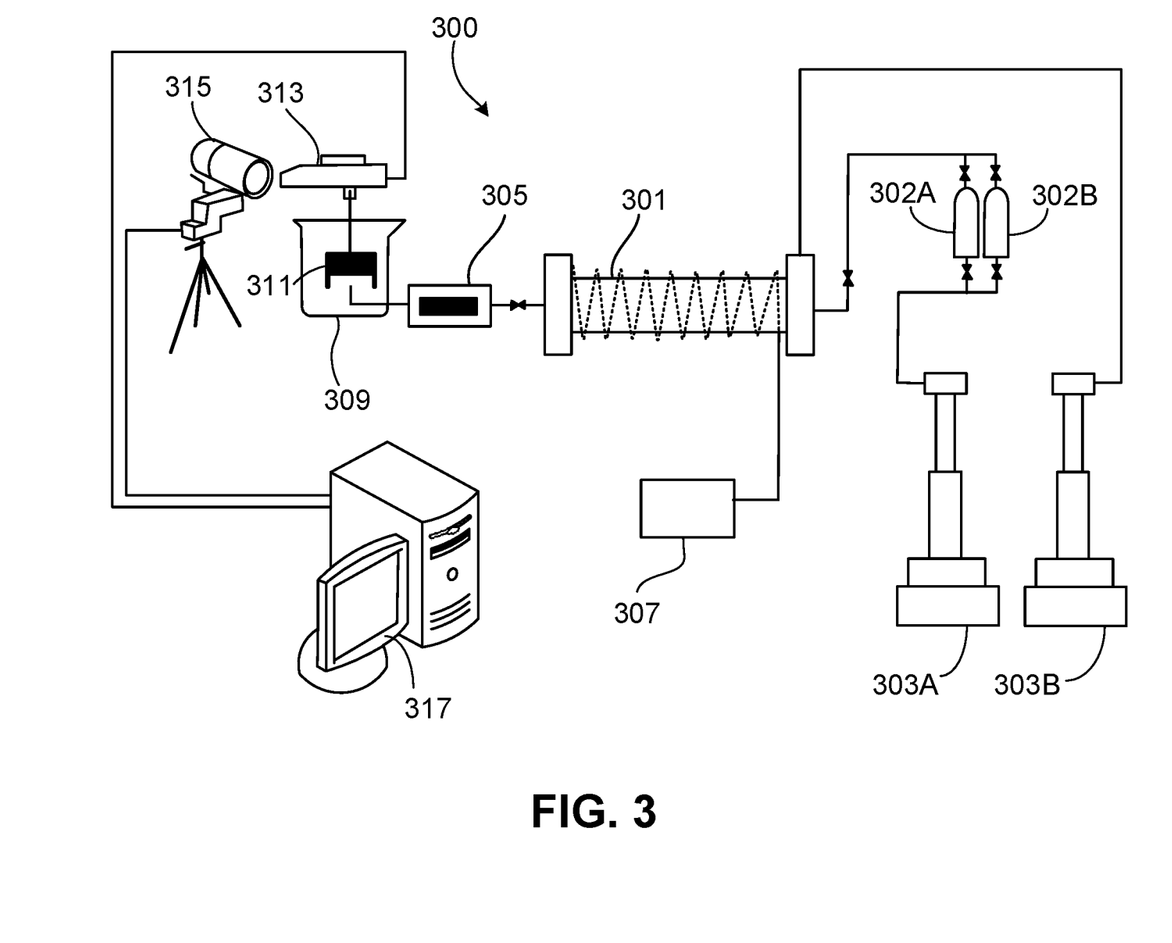
FIG. 3 is a diagram of an example of a core flooding apparatus.

FIG. 3 illustrates an example of a core flooding apparatus 300. The core flooding apparatus 300 can include a core holder 301, an oil vessel 302A, a testing fluid vessel 302B, an injection pump 303A, a confining pressure pump 303B, a pressure controller 305, a temperature controller 307, a discharge container 309, an oil collector 311, a scale 313, a camera 315, and a computer 317. A rock sample can be secured in the core holder 301, and the core holder 301 can hold the rock sample as a fluid is pumped through the rock sample. The rock sample can be a rock sample that is similar to the rock sample used in a contact angle measurement (rock sample 201). For example, the rock sample placed in the core holder 301 can be a rock sample of the formation from which hydrocarbon extraction is desired. The rock sample can have a cylindrical shape that can fit within the core holder 301. The oil vessel 302A can contain hydrocarbon fluid (for example, hydrocarbon oil from a rock formation). The testing fluid vessel 302B can contain a testing fluid (for example, connate water from a rock formation, seawater, or salinated treated wastewater developed from method 100).

The injection pump 303A can be used to pump fluid from the oil vessel 302A or the testing fluid vessel 302B and through the core holder 301 in order to flood the rock sample with oil or testing fluid. By opening and closing various valves, the injection pump 303A pumps fluid from one vessel (302A or 302B), not from both vessels (302A and 302B) simultaneously. The confining pressure pump 303B can be used to set a confining pressure against the rock sample in the core holder 301 to mimic subsurface conditions. For example, the confining pressure can be within a range of approximately 50 pounds per square inch gauge (psig) to 5,000 psig. The pressure controller 305 can regulate backpressure by controlling a valve, which can prevent fluid from reverse-flowing back into the rock sample. The temperature controller 307 can maintain an operating temperature that mimics subsurface conditions. For example, the temperature controller 307 can maintain a temperature within a range of approximately 90° C. to 180° C. (194° F. to 356° F.).

The discharge container 309 can hold the fluid exiting the core holder 301 through the backpressure valve. The oil collector 311 can be placed within the discharge container 309, such that the oil collector 311 can collect any oil that is discharged from the core holder 301. Since oil is less dense than water (and other similar aqueous solutions), the oil discharged from the core holder 301 can rise into the oil collector 311. The scale 313 can measure the weight of oil extracted from the rock sample after a core flooding test, and the scale 313 can be connected to the computer 317, which can use the weight (or change in weight) and known fluid densities of the oil and the testing fluid to calculate the amount of oil extracted from the rock sample. The camera 315 can obtain image data of the discharge container 309 and the oil collector 311 as an alternative or confirmatory method of calculating the amount of oil extraction based on the change in volume. In relation to method 100, the core flooding apparatus 300 can be utilized to test salinated treated wastewater to determine a shift in wettability of a rock sample at step 103. An increase in an Amott index value, an Amott-Harvey index value, or a USBM index value calculated from utilizing the core flooding apparatus 300 can signify a shift in wettability of the rock sample toward water-wetness. The core flooding apparatus 300 can also be utilized to test salinated treated wastewater to determine a change in oil recovery from a rock sample at step 105. The core flooding apparatus 300 can be utilized to test various testing fluids in succession. For example, once steady-state is achieved (that is, no more significant oil extraction is observed) utilizing one testing fluid, another testing fluid can be used to flood the rock sample in order to extract more oil from the rock sample.

Example

The following table provides ionic compositions of various testing fluids.

| Ion/salt type | Testing fluids and their compositions* | | | | |
| --- | --- | --- | --- | --- | --- |
| | Connate water | Seawater | 2-times diluted seawater | 10-times diluted seawater with Mg salt | Mg-rich water |
| Sodium | 60 | 18 | 9 | 1.8 | 0 |
| Calcium | 20 | 0.7 | 0.35 | 0.07 | 0 |
| Magnesium | 3 | 2 | 1 | 2.2 | 2 |
| Sulfate | 0 | 4 | 2 | 0.4 | 0 |
| Chloride | 132 | 32 | 16 | 9.1 | 5.9 |
| Total dissolved solids (TDS) | 215 | 56.7 | 28.4 | 13.6 | 7.9 |

*Compositions are in 1,000 ppm.

Figure 4:
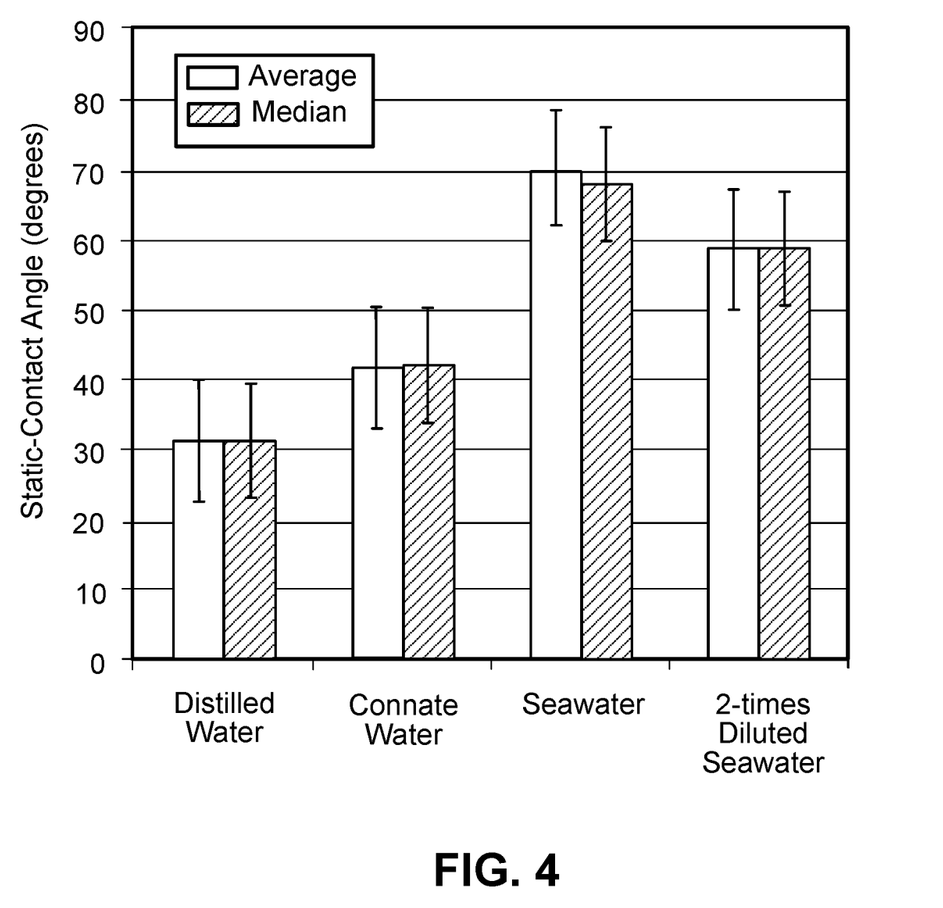
FIG. 4 is a graph of contact angle measurements of various fluids.

FIG. 4 is a graph of contact angle measurements of various testing fluids. The four fluids shown in FIG. 4 (distilled water, connate water, seawater, and 2-times diluted seawater) were not developed by method 100, but the graph shows the effect of salinity with respect to wettability of a rock sample. The various fluids were tested on a rock sample (Iceland spar calcite) with the contact angle measurement apparatus 200. As shown in the graph of FIG. 4, distilled water, which has the lowest salinity of the fluids shown, provides the smallest contact angle (meaning most water-wet) between an oil droplet and the rock sample submerged in distilled water in comparison to the other fluids. Seawater, which has the highest salinity of the fluids shown, provides the largest contact angle (meaning least water-wet) between an oil droplet and the rock sample submerged in seawater in comparison to the other fluids. Surfaces that are more water-wet can allow more oil to flow away from them and therefore be extracted.

Figure 5:
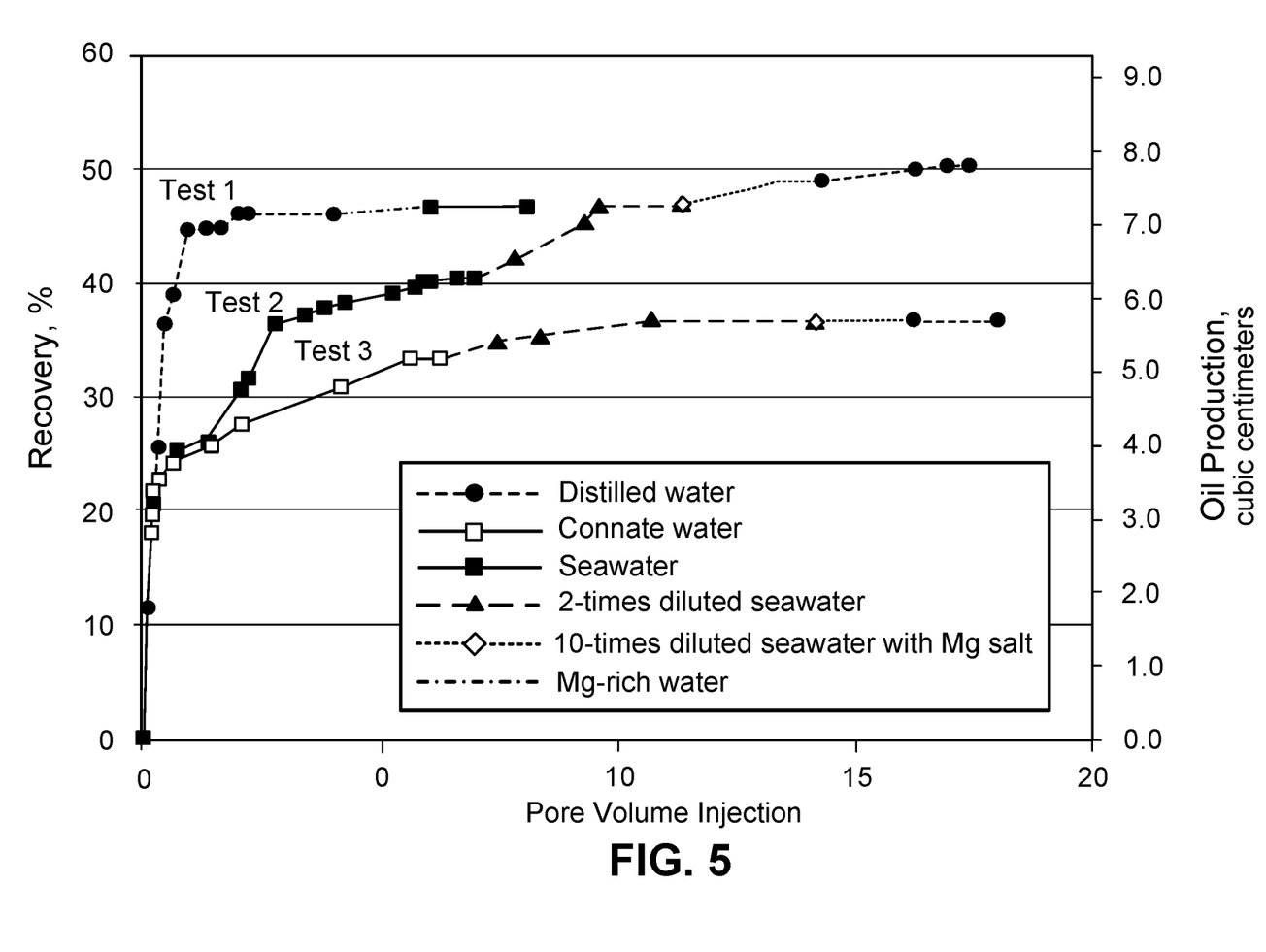
FIG. 5 is a graph of oil recovery results of various core flooding experiments.

FIG. 5 is a graph of oil recovery results of various core flooding experiments. Like the fluids shown in FIG. 4, the six fluids shown in FIG. 5 (distilled water, connate water, seawater, 2-times diluted seawater, 10-times diluted seawater with Mg salt, and Mg-rich water) were not developed by method 100, but the graph shows the effect of injecting various fluids of varying salinities in succession in order to extract additional oil from a rock sample. In comparison to salinated treated wastewater, the distilled water can be viewed as being the closest match due to the calcium dissolution directly from the outcrop sample during the core flooding tests. The various fluids were tested on outcrop samples with the core flooding apparatus 300. The left y-axis provides percent oil recovery from the outcrop sample for the various tests. The right y-axis provides oil recovery from the outcrop sample in cubic centimeters ($cm^3$) for the various tests. The x-axis provides the extent of pore volume injections for the various tests.

For Test 1, the succession of injections was: first injection of distilled water; second injection of Mg-rich water; and third injection of seawater. A total of approximately 8 pore volumes were injected across the sample during Test 1 to recover approximately 47% of the initial oil from the outcrop sample (amounting to approximately 7 $cm^3$). For Test 2, the succession of injections was: first injection of seawater; second injection of 2-times diluted seawater; third injection of 10-times diluted seawater; and fourth injection of distilled water. A total of approximately 18 pore volumes were injected across the sample during Test 2 to recover approximately 50% of the initial oil from the outcrop sample (amounting to approximately 8 $cm^3$). For Test 3, the succession of injections was: first injection of connate water; second injection of 2-times diluted seawater; third injection of 10-times diluted seawater; and fourth injection of distilled water. A total of approximately 18 pore volumes were injected across the sample during Test 2 to recover approximately 37% of the initial oil from the outcrop sample (amounting to approximately 6 $cm^3$).

As seen in FIG. 5, successive injections of fluids can increase oil extraction. This correlation can also be correlated to the shift in wettability of the sample when exposed to the various injection fluids (referring back to FIG. 4). The order of fluid injection with varying salinity can also affect the total oil extraction. In certain implementations, fluid injections in order of decreasing salinity can increase oil extraction from a rock sample, which can be translated to a prediction of increased hydrocarbon recovery from a rock formation.

This disclosure describes technologies relating to enhancing hydrocarbon recovery by injecting fluids deriving from treated wastewater, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

While this specification contains many specific implementation details, these should not be construed as limitations on the scope of the subject matter or on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

What is claimed is:

1. A method of preparing an injection fluid for enhancing hydrocarbon recovery from a formation, the method comprising:
   adding a divalent salt to a treated wastewater to form salinated treated wastewater, wherein the treated wastewater comprises a total dissolved solids (TDS) level that is less than 15,000 parts per million (ppm), wherein the divalent salt comprises a magnesium salt, a calcium salt, a sulfate, or a combination thereof, and wherein the salinated treated wastewater has a magnesium salt concentration within a range of 5,000 ppm to 25,000 ppm;
   testing the salinated treated wastewater for a shift in wettability;
   testing the salinated treated wastewater for a change in oil recovery; and
   applying the salinated treated wastewater as an injection fluid, wherein the shift in wettability is equal to or greater than a predetermined wettability differential value, and the change in oil recovery of the salinated treated wastewater is equal to or greater than a predetermined oil recovery differential value.

2. The method of claim 1, wherein the predetermined wettability differential value is a difference in the shift in wettability of a first rock sample tested with the wastewater prior to salination and following salination.

3. The method of claim 2, wherein the predetermined oil recovery differential value is a difference in an amount of oil recovered from a second rock sample with the wastewater prior to salination and following salination.

4. The method of claim 3, wherein testing the salinated wastewater for a change in oil recovery comprises performing a core flooding experiment.

5. The method of claim 3, wherein the first rock sample comprises a representative sample of the formation, and the second rock sample comprises a representative sample of the formation.

6. The method of claim 5, wherein testing the salinated wastewater for a shift in wettability comprises measuring a contact angle between an oil droplet and the first rock sample submerged in the salinated wastewater, wherein a decrease in the contact angle signifies a shift toward water-wetness and an increase in the contact angle signifies a shift toward oil-wetness.

7. The method of claim 5, wherein the salinated wastewater has a sulfate salt concentration within a range of 1,000 ppm to 20,000 ppm.

8. The method of claim 5, wherein the salinated wastewater comprises a sulfate salt, the salinated treated wastewater having a sulfate salt concentration lower than the magnesium salt concentration.

9. The method of claim 8, wherein the sulfate salt is added after the magnesium salt.

10. A method of preparing an injection fluid for enhancing hydrocarbon recovery from a formation, the method comprising:
   adding a divalent salt to a treated wastewater to form salinated treated wastewater, wherein the treated wastewater comprises a total dissolved solids (TDS) level that is less than 15,000 parts per million (ppm), wherein the divalent salt comprises a magnesium salt, a calcium salt, a sulfate, or a combination thereof, and wherein the salinated treated wastewater has a magnesium salt concentration within a range of 5,000 ppm to 25,000 ppm;
   testing the salinated treated wastewater for a shift in wettability;
   testing the salinated treated wastewater for a change in oil recovery; and
   applying the salinated treated wastewater as an injection fluid, wherein the shift in wettability is equal to or greater than a predetermined wettability differential value, and the change in oil recovery of the salinated treated wastewater is equal to or greater than a predetermined oil recovery differential value,
   wherein the predetermined wettability differential value is a difference in the shift in wettability of a first rock sample tested with the treated wastewater prior to salination and following salination,
   wherein the predetermined oil recovery differential value is a difference in an amount of oil recovered from a second rock sample with the treated wastewater prior to salination and following salination.

11. The method of claim 10, wherein the predetermined oil recovery differential value is at least 3%.

12. The method of claim 10, wherein the predetermined oil recovery differential value is at least 5%.

13. The method of claim 10, wherein the predetermined wettability differential value is at least a change of 5 degrees in contact angle.

14. The method of claim 10, wherein the predetermined oil recovery differential value ranges between 3% and 10%.

15. The method of claim 10, wherein the predetermined oil recovery differential value ranges between 3% and 5%.

16. The method of claim 10, wherein the first and second rock samples comprises representative samples of a formation in which enhancing hydrocarbon recovery is desired.

* * * * *